US007292550B2

(12) United States Patent
Dunn et al.

(10) Patent No.: US 7,292,550 B2
(45) Date of Patent: Nov. 6, 2007

(54) SYSTEM AND METHOD FOR MINIMIZING VOICE PACKET LOSS DURING A WIRELESS COMMUNICATIONS DEVICE CANDIDATE FREQUENCY SEARCH (CFS)

(75) Inventors: Douglas L. Dunn, San Diego, CA (US); Henry Chang, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 1083 days.

(21) Appl. No.: 10/402,533

(22) Filed: Mar. 27, 2003

(65) Prior Publication Data

US 2004/0190472 A1 Sep. 30, 2004

(51) Int. Cl.
*H04Q 7/00* (2006.01)

(52) U.S. Cl. ........................................ 370/331; 455/436
(58) Field of Classification Search ............... None
See application file for complete search history.

(56) References Cited

U.S. PATENT DOCUMENTS

| 6,226,607 | B1 | 5/2001 | Chang et al. | |
|---|---|---|---|---|
| 6,459,689 | B1 | 10/2002 | Czaja et al. | |
| 6,535,563 | B2* | 3/2003 | Tiedemann et al. | 375/344 |
| 6,587,446 | B2* | 7/2003 | Sarkar et al. | 370/331 |
| 6,597,922 | B1* | 7/2003 | Ling et al. | 455/522 |
| 6,665,281 | B1* | 12/2003 | Kim | 370/331 |
| 6,748,215 | B1* | 6/2004 | Chen et al. | 455/434 |
| 6,788,748 | B2* | 9/2004 | Chen et al. | 375/316 |
| 6,865,173 | B1* | 3/2005 | Czaja et al. | 370/342 |
| 7,010,068 | B2* | 3/2006 | Tiedemann et al. | 375/344 |
| 7,089,004 | B2* | 8/2006 | Jeong et al. | 455/436 |
| 7,136,366 | B2* | 11/2006 | Kim | 370/331 |
| 2002/0107020 | A1* | 8/2002 | Lee | 455/436 |
| 2003/0114172 | A1* | 6/2003 | Jeong et al. | 455/436 |
| 2004/0121774 | A1* | 6/2004 | Rajkotia et al. | 455/441 |
| 2007/0064640 | A1* | 3/2007 | Grilli et al. | 370/320 |

FOREIGN PATENT DOCUMENTS

WO    WO 02/08122 A1    4/2002

* cited by examiner

*Primary Examiner*—Wellington Chin
*Assistant Examiner*—Anh-Vu Ly

(57) ABSTRACT

A system and method are presented for minimizing loss of voice packet during a wireless communications device Candidate Frequency Search (CFS). The method includes monitoring frames in a predetermined sample frame sequence and identifying frames having minimal user information. That is, frames with lower frame rates. The method further includes, in a wireless communications device, performing a CFS responsive to identifying frames having minimal user information. One example of the method includes identifying a lowest frame rate in an initial frame and performing a CFS in a frame following the initial frame. The method includes monitoring forward direction link frames and reverse direction link frames, and simultaneously monitoring forward and reverse direction link frames.

33 Claims, 5 Drawing Sheets

SYSTEM AND METHOD FOR MINIMIZING VOICE PACKET LOSS DURING A WIRELESS COMMUNICATIONS DEVICE CANDIDATE FREQUENCY SEARCH (CFS)

BACKGROUND OF THE INVENTION

1. Field of the Invention

This invention generally relates to wireless telephone communications and, more particularly, to a system and method for managing Candidate Frequency Searches in communications between wireless communications telephone devices and wireless communications base stations.

2. Description of the Related Art

A wireless communications telephone base station (BS) provides a serving frequency (band) for a Code Division Multiple Access (CDMA) wireless communications device within a coverage area of limited size. As a wireless device moves through one coverage area to an adjoining coverage area, the wireless device switches from the serving frequency for the first coverage area BS to the serving frequency for the adjoining coverage area BS. Such a switch is called a hard handoff. For example, a wireless device moves to the edge of a first coverage area until the power level for the serving frequency in the first area is insufficient to be received by the wireless device. At that point, the first BS instructs the wireless device to switch to the BS for an adjoining coverage area with a serving frequency having a power level sufficient to be received by the wireless device. If a problem occurs during the switch to the adjoining serving frequency, the call may be dropped since the first serving frequency is no longer supporting the call.

Hard handoffs can be performed by the BS without assistance from the wireless device. In these instances, a BS monitors the signal strength from a wireless device, and when the observed power level is not sufficient to support communications between the BS and the wireless device, the BS issues an order to the wireless device to switch or handoff to a different serving frequency corresponding to an adjacent coverage area. Unassisted hard handoffs have at least two problems. Frequently, calls are dropped while performing a hard handoff, because the wireless device has insufficient signal quality from the adjacent coverage area. In other cases, the wireless device ping-pongs, or oscillates between the serving frequency in the first coverage area and the serving frequency in an adjoining coverage area. This occurs if the power level from the wireless device observed by the BS in the adjoining area is not consistently sufficient to support communications between the BS and the wireless device.

With the advent of TIA/EIA-95-B, hard handoffs can be performed with the help of the wireless device. Such handoffs are called Mobile Assisted Hard Handoffs (MAHHOs). The assistance provided by the wireless device during a MAHHO is called a Candidate Frequency Search (CFS). In a MAHHO, as a wireless device approaches the edge of its current coverage area, the BS providing the coverage orders the wireless device to perform a CFS. In performing the CFS, the wireless device will check the power level of the pilot signal for the service frequency in an adjacent coverage area (perform a CFS) and report the results of the CFS back to the BS. If the wireless device reports an adjacent frequency pilot signal sufficient for receiving by the wireless device, the BS will order the wireless device to perform a hard handoff to the adjoining coverage area. If the wireless device reports a pilot signal power level insufficient to be received by the wireless device, the BS may allow the wireless device to stay on its current serving frequency until the wireless device reports pilot signal power levels sufficient to be received by the wireless device in a subsequent CFS.

A MAHHO may reduce the number of calls dropped during hard handoffs and the instances of oscillation between serving frequencies. However, while the wireless device is performing a CFS, the wireless device may also be generating voice packets for transmission or the BS may be transmitting voice packets for receipt by the wireless device. Unfortunately, a MAHHO requires the wireless device to tune away from the serving frequency during a CFS. Therefore, the above-mentioned voice packets are lost as a consequence of the CFS. The loss of these packets can result in a noticeable degradation of the voice communications.

It would be advantageous if a CFS for a wireless communications device could be performed with a minimal disruption of transmit and receive voice packets.

SUMMARY OF THE INVENTION

The present invention addresses the identification of communication link frames during which it is optimal to perform a Candidate Frequency Search (CFS) for a wireless communications device during a Mobile Assisted Hard Handoff (MAHHO). The invention recognizes that transmissions to and from a wireless device are disrupted during a CFS. The invention addresses this problem by identifying, as preferred link frames during which to perform a CFS, communication link frames containing minimal or no user information. For example, frames occurring during pauses or silence in voice conversations.

Accordingly, a method is presented for minimizing loss of voice packets during a wireless communications device CFS. The method includes monitoring frames for voice packet content in a predetermined sample frame sequence; identifying minimal information frame rates in the monitored frames; and, in a wireless communications device, performing a CFS responsive to identifying minimal information frame rates. In one case, identifying minimal information frame rates includes identifying a transition frame rate in an initial frame and then identifying the rate of a prior frame immediately preceding the initial frame. A first case includes identifying in the prior frame, a higher frame rate, and performing a CFS in a frame following the initial frame. A second case includes identifying in the prior frame a lower frame rate, identifying a trigger frame, subsequent to the initial frame, having a transition frame rate, and performing a CFS in a frame following the trigger frame. A third case includes identifying in the prior frame a lower frame rate, identifying a full frame rate in all frames subsequent to the initial frame, and performing a CFS in a last frame in the sample frame sequence.

The method includes monitoring forward direction link frames and reverse direction link frames, and simultaneously monitoring forward and reverse direction link frames. The method also includes: monitoring frames in a wireless device in response to an Implicit Action Time Command from a base station; or, monitoring frames in a wireless communications base station and performing a CFS in response to an Explicit Action Time Command from the base station.

Additional details of the above-described method, and a system for minimizing loss of voice packets during a wireless communications device CFS are provided below.

DETAILED DESCRIPTION OF THE PREFERRED EMBODIMENTS

Figure 1:
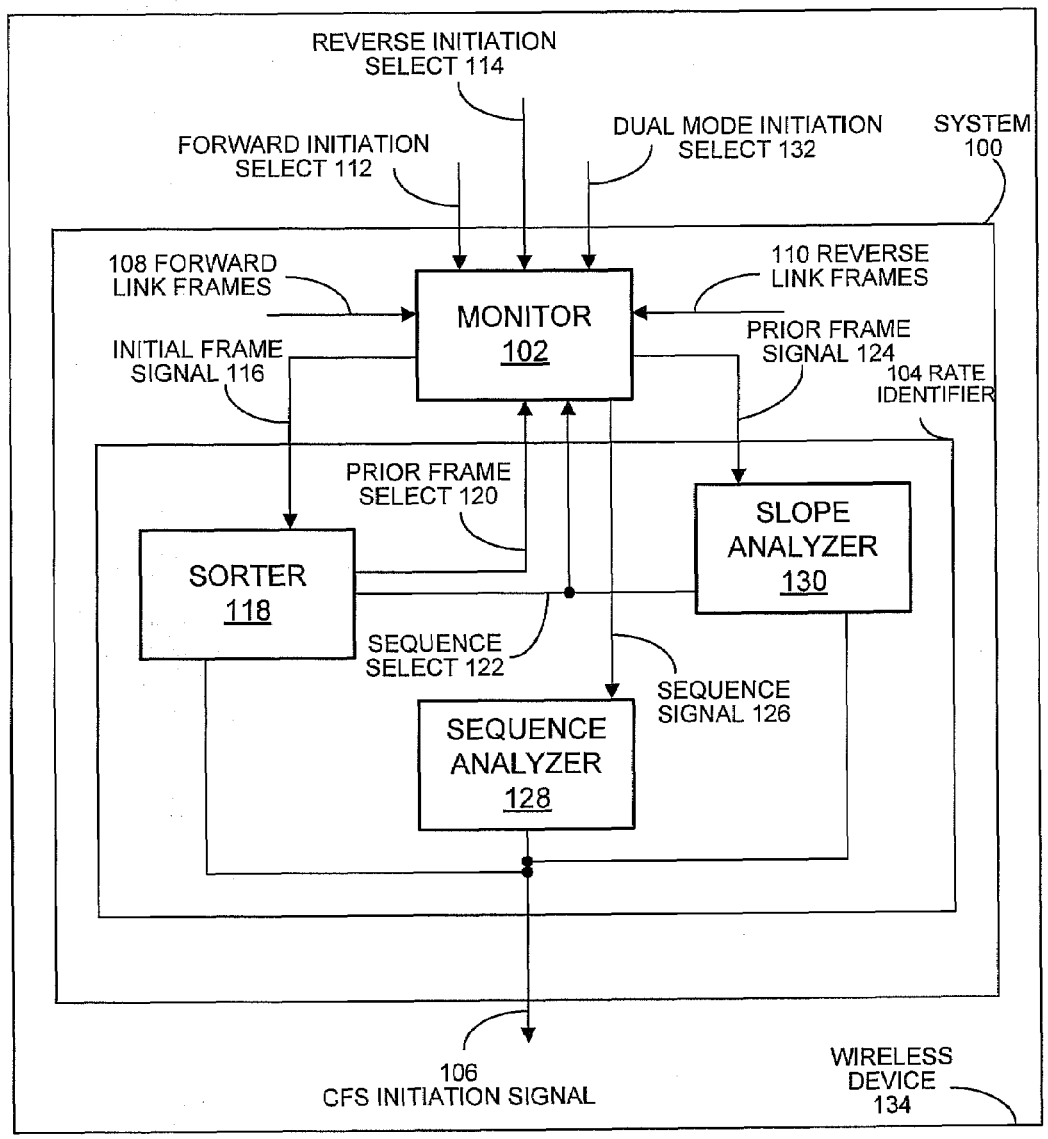
FIG. 1 is a schematic block diagram of the system for minimizing loss of voice packets during a wireless communications device Candidate Frequency Search (CFS) in accordance with the present invention.

FIG. 1 is a schematic block diagram of the system 100 for minimizing loss of voice packets during a wireless communications device Candidate Frequency Search (CFS) in accordance with the present invention. The present invention strives to identify communication link frames with minimal user information, preferably lower rate frames that are sent during pauses in a voice conversation, to use as frames for starting a CFS associated with a Mobile Assisted Hard Handoff (MAHHO). As described in the above Background section, voice packets in communication link frames can be lost during a CFS. Therefore, if the CFS is performed in a link frame containing minimal user data, there is minimal degradation of a wireless communication. The system 100 includes a monitor 102 and a rate identifier 104. The rate identifier 104 has an output to supply a CFS signal on line 106 identifying a communication link frame in which to perform a CFS in response to identifying minimal information frame rates in the monitored frames. The actual CFS operation is performed by other elements of the wireless device (not shown), outside the system 100.

The following discussion presents a series of examples for the operation of the system 100. It is understood that these examples are not exhaustive, and that other possible operation examples are included within the present invention. The system 100 examples are based on three types of link frames as defined in the TIA/EIA-733 standard: a full rate frame, a transition rate frame, and a lowest rate frame. The rate of a frame generally refers to the amount of information carried in the frame, typically expressed in bits/second. Control functions, such as maintaining the traffic channel, are supported in all three types of frames. A full rate frame is used to transmit user information. Under the TIA/EIA-733 standard, a full frame rate is 14400 bits/second. A lowest rate frame, or automatic threshold rate frame, is used during pauses or silences in voice messages to transmit white noise. A typical lowest frame rate is ⅛ the rate of a full rate, or a ⅛ rate. A transition rate frame occurs between a full rate frame and a lowest rate frame during the transition from a full rate frame to a lowest rate frame or from a lowest rate frame to a full rate frame. Under the TIA/EIA-733 standard, a transition rate frame may contain user data, but the rate of the transition frame is typically less than a full frame rate. For example, typical transition frame rates include a ¼ rate and a ½ rate for a 13 k vocoder specified in TIA/EIA-733 and a ½ rate for an enhanced variable rate coder (EVRC) specified in TIA/EIA-127. Transition rate frames and lowest rate frames are preferred for beginning a CFS. It is understood that the present invention is not limited to the TIA/EIA-733 or TIA/EIA-127 standard frame types and that the invention is applicable to other definitions and combinations of frames and frame rates.

Transition rates for a 13 k vocoder are used in the system 100 examples that follow. It is understood that examples using other transition rates, such as those for an EVCR, also are applicable to the system 100. The monitor 102 includes an input to accept forward communication link frames on line 108 and an input to accept reverse communication link frames on line 110. The monitor 102 also includes a control input to accept a forward initiation select signal on line 112, a control input to accept a reverse initiation select signal on line 114, and an output to supply an initial frame signal on line 116. The system 100 can operate in a single mode. That is, at any one time, the system 100 can operate on either forward or reverse communication link frames. In response to receiving a forward initiation select signal, the monitor 102 supplies, in the initial frame signal, the current forward link frame in the monitor 102. That is, the forward link frame accepted by the monitor immediately after the receipt of a forward initiation select signal. In a similar manner, the monitor 102 supplies, in the initial frame signal, the current reverse link frame in the monitor 102, in response to the reverse initiation select signal. Once the monitor 102 supplies the initial frame signal on line 116, the operation of the system 100 is the essentially the same for both forward and reverse communication link frames. Therefore, further reference to forward or reverse frames will only be made in those instances where the system 100 operates differently on forward or reverse frames.

The rate identifier 104 includes a sorter 118 with an input to accept the initial frame signal on line 116 and a control output to supply a prior frame select signal on line 120. The sorter 118 also includes a control output to supply a sequence select signal on line 122 and an output to supply the CFS initiation signal on line 106. In response to receiving the initial frame signal, the sorter identifies the rate of the frame in the initial frame signal and supplies the prior frame signal, the CFS initiation signal, or the sequence select signal in accordance with the rate of the initial frame.

For a transition ½ frame rate, the sorter 118 supplies the prior frame select signal on line 120. For a full rate frame, the sorter 118 supplies the sequence select signal on line 122. In these two instances, further analysis is required by the system 100 before an optimal CFS frame can be identified. For an automatic threshold frame rate or a transition ¼ frame rate, the sorter supplies the CFS initiation signal on line 106. The CFS initiation signal identifies the frame immediately following the initial frame, since the frame following the initial frame will be preferred for initiating a CFS. In the case of the automatic threshold frame rate, the frame following the initial frame will either have another automatic threshold rate or a transition ¼ rate. In the case of the transition ¼ frame rate, the frame following the initial frame will have an automatic threshold rate (if the frame prior to the initial frame has a transition ½ rate) or a transition ½ rate (if the frame prior to the initial frame has an automatic threshold rate).

The monitor 102 includes a control input to accept the prior frame select signal on line 120, an output to supply a prior frame signal on line 124, a control input to accept the sequence select signal on line 122, and an output to supply a sequence signal on line 126. In response to the prior frame select signal, the monitor 102 supplies the prior frame signal with a prior frame immediately preceding the initial frame in the initial frame signal. The prior frame is examined because the rate of the prior frame can be used to predict the rate for the frame following the current frame. For example, if a current frame with a transition frame rate is preceded by a frame with a full frame rate, a sequence of frames having the current frame is transitioning to lower frame rates.

In response to the sequence select signal, the monitor 102 supplies the sequence signal on line 126 with a predetermined, consecutive sequence of link frames. The sequence typically begins with the frame immediately following the initial frame. A sequence of frames is used because the rates for frames following the current full frame cannot be determined from the prior frame rate and the frames following the initial frame can be examined to find a frame suitable for beginning the CFS. A base station allows a limited time frame for determining when to implement a CFS. The length of the abovementioned sequence is selected to fit this limited time frame. Typically, the sequence consists of about four to seven frames, each frame being about 20 milliseconds long.

The rate identifier 104 also includes a sequence analyzer 128 with an input to accept the sequence signal on line 126 and an output to supply the CFS initiation signal on line 106. In response to the sequence signal, the sequence analyzer 128 identifies the rates of frames in the sequence signal. In general, if a frame with a transition rate is identified, the sequence analyzer 128 supplies a CFS initiation signal identifying a frame following the frame with the transition frame rate. In the case of a 13 k vocoder, the CFS initiation signal can identify a first frame immediately following the frame with the transition rate (the first frame has a ¼ frame rate) or it could identify the frame following the first frame. This frame has an automatic threshold rate. If only full frame rates are identified in all frames in the sequence, there is no optimal frame in the sequence. However, a CFS must be performed within the sequence. Therefore, the sequence analyzer 128 supplies a CFS initiation signal identifying the last frame in the sequence.

The rate identifier 104 includes a slope analyzer 130 with a control output to supply the sequence select signal on line 122, an input to accept the prior frame signal on line 124, and an output to supply the CFS initiation signal on line 106. In response to accepting the prior frame signal, the slope analyzer 130 identifies the rate of the prior frame in the prior frame signal. If the slope analyzer 130 identifies a ¼ frame rate for the prior frame, the frame following the initial frame will be a full frame rate. Therefore, the slope analyzer 130 supplies the sequence select signal. This case is the same as described above for a full frame rate in the initial frame. If the slope analyzer 130 identifies a full frame rate for the prior frame, the frame following the initial frame will be a ¼ frame rate. Therefore, the slope analyzer supplies the CFS initiation signal identifying a frame following the initial frame. As noted above for a 13 k vocoder, the CFS initiation signal can identify a first frame immediately following the frame with the transition rate (the first frame has a ¼ frame rate) or it could identify the frame following the first frame. This frame has an automatic threshold rate.

The system 100 also can operate in a dual mode. That is, the system 100 can simultaneously operate on forward and reverse link frames. Therefore, the monitor 102 has a control input to accept a dual mode initiation select signal on line 132. In general, while in the dual mode, the system 100 performs the same operations as are performed in response to the individual forward and reverse initiation select signals. As is the cases described above for the operation of the system 100 in either the forward or reverse direction, the following discussion presents a series of examples for the operation of the system 100 in the dual mode. It is understood that these examples are not exhaustive, that other possible operation examples are included within the present invention, and that the principles developed for the examples below can be applied to other cases not explicitly shown.

In response to the dual mode initiation select signal, the monitor 102 supplies, in the initial frame signal, the forward and reverse initial frames described above. Some of the examples below assume that the first initial frame and sequence are in the forward direction and the second initial frame and sequence are in the reverse direction. It is understood that these directions can be switched. The sorter 118 identifies the rates of the forward and reverse initial frames in the initial frame signal. If any combination of automatic threshold rates and transition ¼ frame rates is detected in the forward and reverse initial frames, the sorter 118 supplies a CFS initiation signal on line 106 identifying a frame immediately following either the forward or reverse initial frames.

If a full frame rate is detected in both the forward and reverse initial frames, the sorter 118 supplies the sequence select signal on line 122 identifying both the forward and reverse sequences. In response, the monitor 102 supplies the sequence signal with both the forward and the reverse frame sequences as described above for the single mode. The sequence analyzer 128 simultaneously operates on each of the two frame sequences respectively, as described above for forward or reverse link communication frames. That is, first the sequence analyzer 128 simultaneously operates on the first frame each in the forward and reverse sequences, then on the second frame each in the forward and reverse sequences, and so forth. If transition frames are simultaneously identified in both sequences, the sequence analyzer 128 supplies the CFS signal identifying a frame immediately following either the forward or reverse frames containing the transition frame rate. If in the course of operating on pairs of frames, a transition frame rate is first found in the forward sequence, and at a later point in the course of operations, a transition frame is found in the reverse sequence, the CFS initiation signal identifies the frame immediately following the frame with a transition rate in the reverse sequence. If only full frame rates are identified in the two sequences, the sequence analyzer 128 supplies the CFS initiation signal identifying the final frames in the sequences.

If a full rate frame is detected in the forward sequence initial frame and an automatic threshold value is detected in the reverse sequence initial frame, the sorter 118 supplies a prior frame select signal identifying the forward sequence. In this case, it is assumed that the reverse sequence will continue to have frames with lowest or transition rates. In response, the monitor 102 supplies the sequence signal with the forward sequence. The sequence analyzer 128 identifies the rates of frames in the sequence signal. If a frame with a transition rate is identified, the sequence analyzer 128 supplies a CFS initiation signal identifying a frame following the frame with the transition frame rate as described above for the single mode. If only full frame rates are identified in all frames in the sequence, there is no optimal frame in the sequence. However, a CFS must be performed within the sequence. Therefore, the sequence analyzer 128 supplies a CFS initiation signal identifying the last frames in the sequences.

If the sorter 118 identifies a full frame rate in the forward initial frame and a transition frame rate in the reverse initial frame, a transition ½ frame rate in both initial frames, or any combination of transition ½ or ¼ frame rates in the forward and reverse initial frames, the sorter 118 supplies the sequence select signal on line 122 identifying both the forward and reverse sequences. In response, the monitor 102 supplies the sequence signal with both the forward and the reverse frame sequences as described above for the single mode. The sequence analyzer 128 operates on each of the two frame sequences respectively, as described above for the single mode. However, in this case, the operations take place simultaneously. If a negative slope or an automatic threshold rate is simultaneously detected in both sequences, the sequence analyzer 128 supplies a CFS initiation signal identifying a frame immediately following either the forward or reverse frames last monitored by the sequence analyzer 128 when the negative slopes and/or automatic threshold rates were detected. A negative slope occurs when the rates in a sequence of frames are decreasing. For example, a sequence in which an initial frame has a ½ transition frame rate and the next frame in the sequence has a ¼ transition frame rate. Detecting a negative slope or an automatic threshold rate ensures that the frame following the last frame in the sequence used to detect the negative slope or the frame following the frame with the automatic threshold rate will have a transition rate or an automatic threshold rate. That is, since there are no frame rates greater than a full frame rate, a negative slope cannot lead to a frame with a full frame rate. If a negative slope or automatic threshold value is not simultaneously detected in both sequences, the sequence analyzer 128 supplies a CFS initiation signal identifying the last frames in the sequences.

The system 100 can be installed in a wireless communications device 134. In this case, the wireless device 134 receives an Implicit Action Time Command (IATC) from a wireless communications base station (not shown). The IATC notifies the wireless device 134 that a CFS is required and allows the wireless device 134 a predetermined time period in which to identify an optimal link frame in which to initiate the CFS. The link frame sequences described above correspond to this time period. In response to the IATC, the wireless device 134 supplies the initiation select signals on lines 112, 114, and 132 as appropriate. The decision regarding which initiation select signal to supply is made outside the system 100. The wireless device 134 accepts the CFS initiation signal on line 106 and executes the CFS accordingly.

Figure 2:
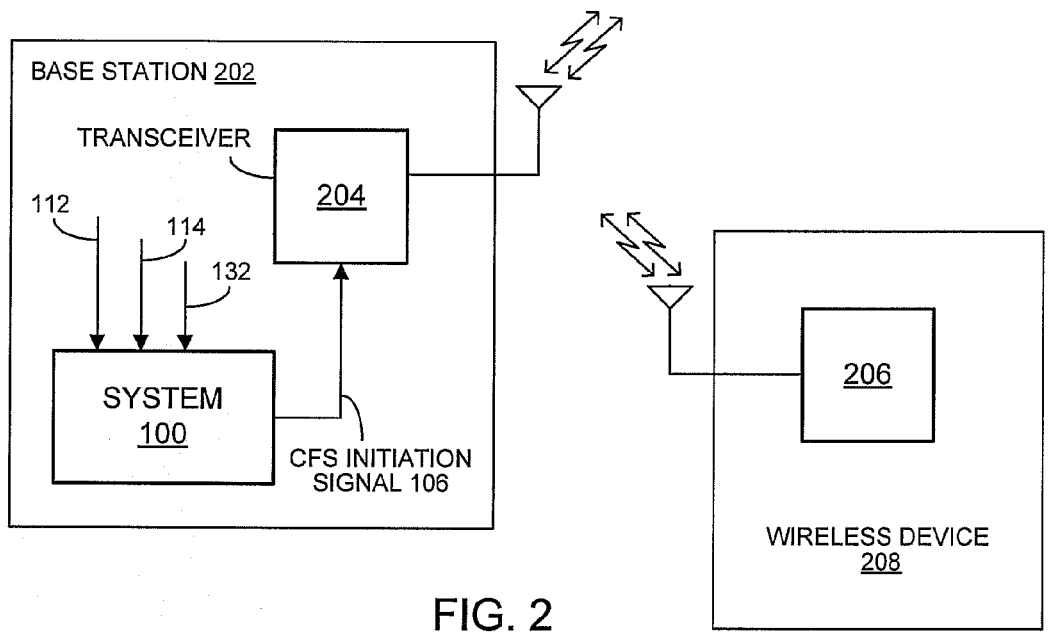
FIG. 2 is a schematic block diagram depicting the present invention system in a wireless communications base station.

FIG. 2 is a schematic block diagram depicting the present invention system in a wireless communications base station. The system 100 can be installed in a wireless communications base station 202 as shown in FIG. 2. The base station 202 supplies the initiation select signals on lines 112, 114, and 132 as appropriate. The decision regarding which initiation select signal to supply is made outside the system 100. The base station transceiver 204 has an input to accept the CFS initiation signal on line 106 and, in response to the CFS initiation signal, transmits an Explicit Action Time command (EATC). A transceiver 206 for a wireless device 208 has a port to receive the EATC. In response to the EATC, the wireless device 208 executes a CFS in the next communication link frame.

Figure 3:
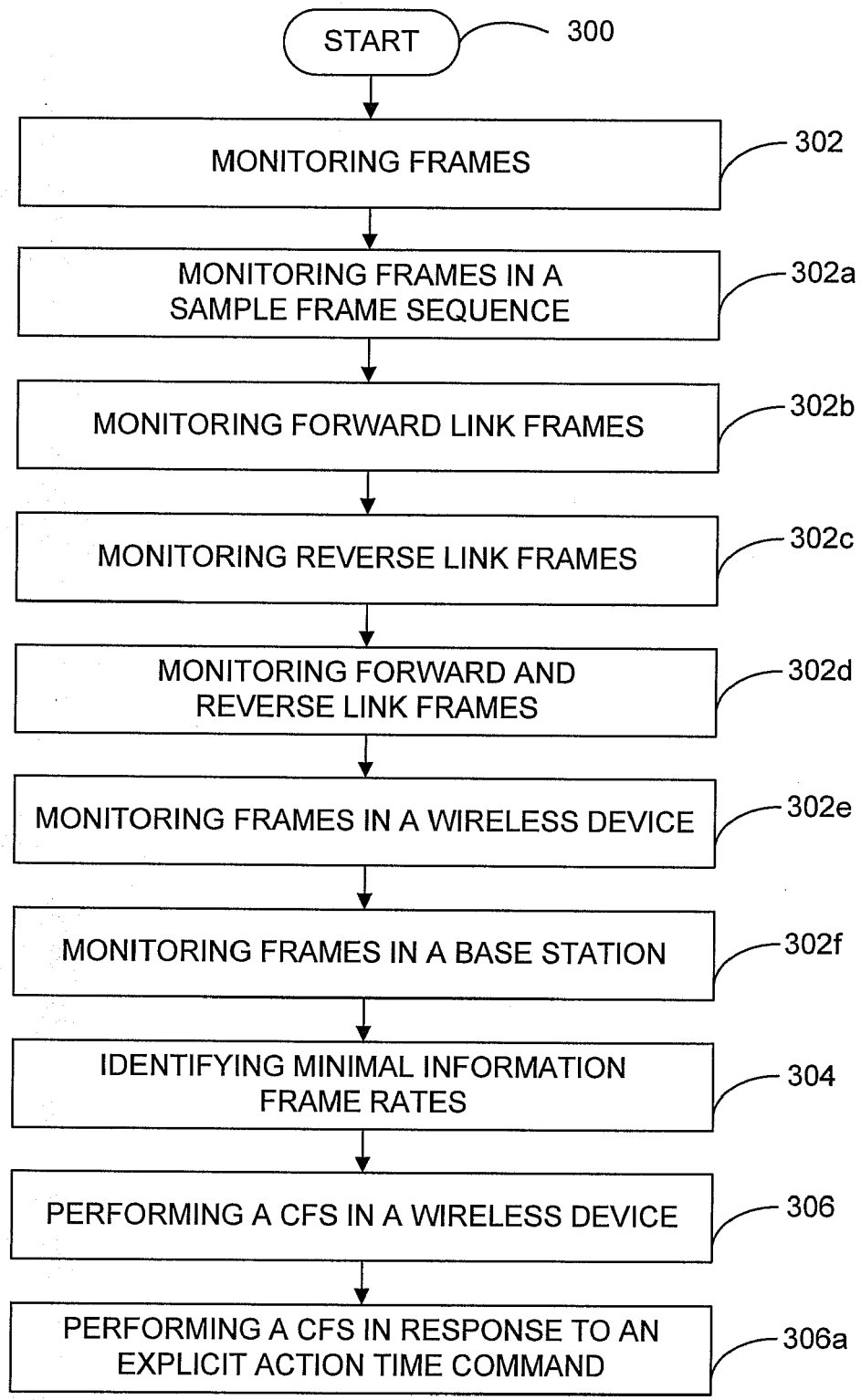
FIG. 3 is a flowchart illustrating the method for minimizing loss of voice packets during a wireless communications device CFS in accordance with the present invention.

FIG. 3 is a flowchart illustrating the method for minimizing loss of voice packets during a wireless communications device CFS in accordance with the present invention. Although the method in FIG. 3 (and FIGS. 4, 5, and 6 below) is depicted as a sequence of numbered steps for clarity, no order should be inferred from the numbering unless explicitly stated. The method starts at Step 300. Step 302 monitors frames. Step 302a monitors frames in a predetermined sample frame sequence. Step 302b monitors forward direction link frames. Step 302c monitors reverse direction link frames. Step 302d monitors forward and reverse direction link frames. Step 302e monitors frames in a wireless device in response to an Implicit Action Time command. Step 302f monitors frames in a wireless communications base station. Step 304 identifies minimal information frame rates in the monitored frames. Step 306, in a wireless communications device, performs a CFS responsive to identifying minimal information frame rates. Step 306a performs a CFS in response to an Explicit Action Time command from the wireless communications base station.

In one aspect of the method, monitoring frames in a predetermined sample frame sequence in Step 302a includes monitoring frames in a sample frame sequence of about four to seven 20 millisecond frames. In another aspect of the method, identifying minimal information frame rates in Step 304 includes identifying a transition rate selected from the group including a ¼ rate and a ½ rate for a 13 k vocoder and a ½ rate for an Enhanced Variable Rate Coder (EVRC). In one aspect of the method, identifying minimal information frame rates in Step 304 includes identifying an automatic threshold rate equal to a ⅛ rate. In another aspect of the method, performing a CFS responsive to identifying minimal information frame rates in Step 306 includes performing a CFS within the sample frame sequence.

Figure 4:
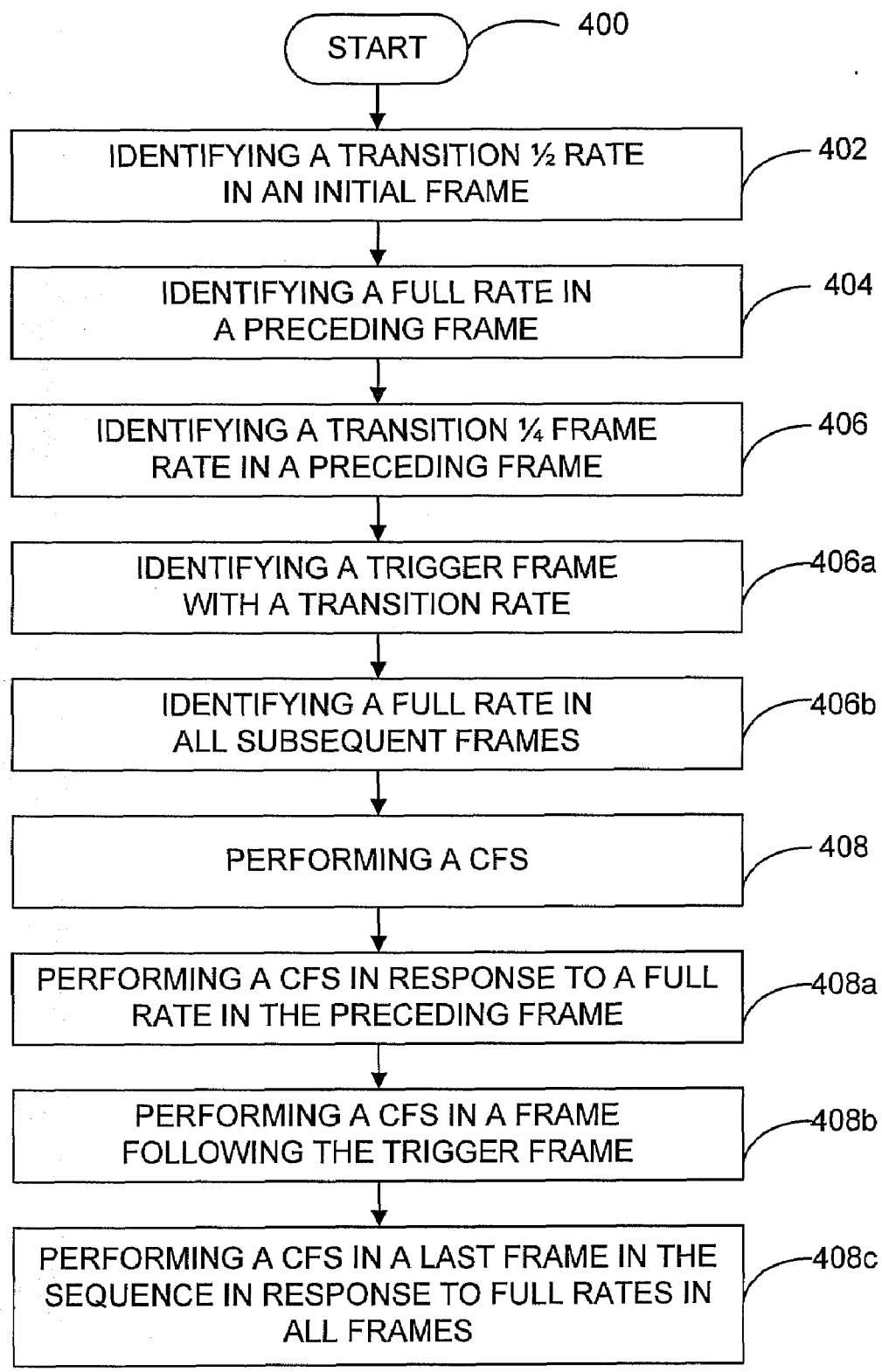
FIG. 4 is a flowchart showing in further detail the method illustrated in FIG. 3.

FIG. 4 is a flow chart showing in further detail the method illustrated in FIG. 3. The method starts at Step 400. Step 402 identifies a transition ½ frame rate in an initial frame. Step 404 identifies in a frame immediately preceding the initial frame, a full rate. Step 406 identifies in a frame immediately preceding the initial frame, a transition ¼ frame rate. Step 406a identifies a trigger frame subsequent to the initial frame having a transition frame rate. Step 406b identifies a full rate in all frames subsequent to the initial frame. Step 408 in a wireless communications device, performs a CFS. Step 408a performs a CFS in a frame following the initial frame in response to a full rate in the preceding frame. Step 408b performs a CFS in a frame following the trigger frame. Step 408c performs a CFS in a last frame in the sample frame sequence in response to a full frame rate in all frames subsequent to the initial frame.

Figure 5:
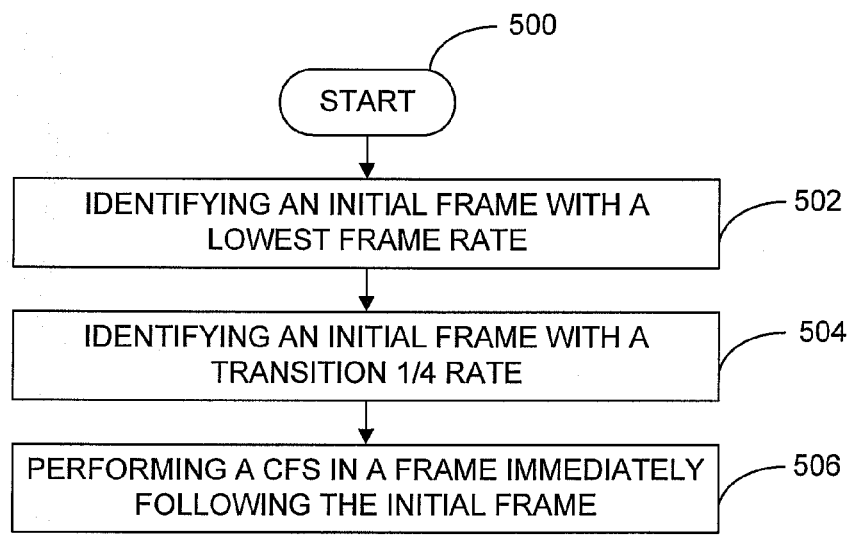
FIG. 5 is a flowchart showing in further detail the method illustrated in FIG. 3.

FIG. 5 is a flow chart showing in further detail the method illustrated in FIG. 3. The method starts at Step 500. Step 502 identifies an initial frame with an automatic threshold frame rate. Step 504 identifies an initial frame with a transition ¼ frame rate. Step 504 in a wireless communications device, performs a CFS in a frame immediately following the initial frame.

Figure 6:
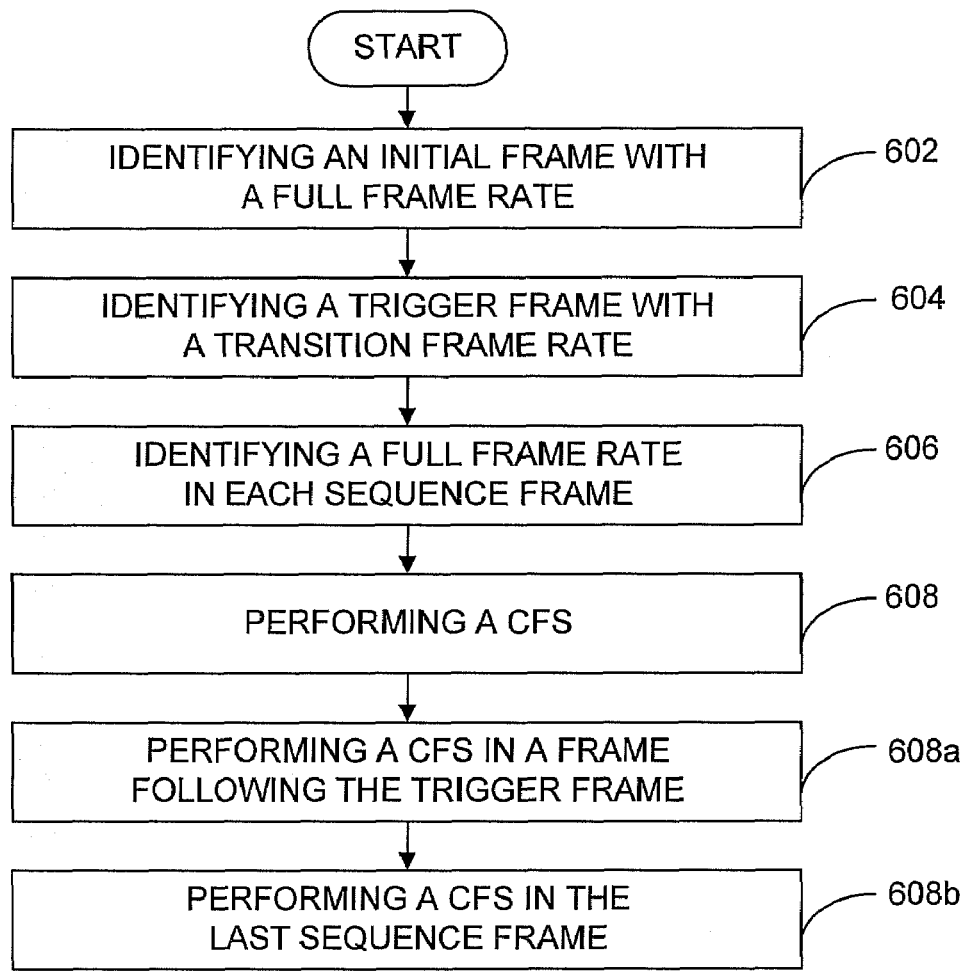
FIG. 6 is a flowchart showing in further detail the method illustrated in FIG. 3.

FIG. 6 is a flow chart showing in further detail the method illustrated in FIG. 3. The method starts at Step 600. Step 602 identifies an initial frame with a full rate frame. Step 604 identifies a trigger frame subsequent to the initial frame with a transition frame rate. Step 606 identifies in each frame of the sample frame sequence, a full frame rate. Step 608 in a wireless communications device, performs a CFS. Step 608a performs a CFS following the trigger frame. Step 608b performs a CFS in the last frame in the sample sequence, in response to a full rate in each frame of the sample frame sequence.

A system and a method are provided for minimizing loss of voice packets during a wireless communications device CFS. Although the invention has been described with reference to particular embodiments, the description is only an example of the invention's application and should not be taken as a limitation. Consequently, other variations and embodiments of the present invention will occur to those skilled in the art and are within the scope of the invention as encompassed by the following claims.

We claim:

1. A method for minimizing loss of voice packets during a wireless communications device Candidate Frequency Search (CFS), the method comprising:
monitoring frames;
identifying minimal information frame rates in the monitored frames; and,
in a wireless communications device, performing a CFS responsive to identifying minimal information frame rates, wherein monitoring frames includes monitoring frames in a predetermined sample frame sequence, a duration of said predetermined sample frame sequence being less than a time frame allowed for determining when to implement the CFS.

2. The method of claim 1 wherein performing a CFS responsive to identified minimal information frame rates includes performing a CFS within the sample frame sequence.

3. The method of claim 1 wherein monitoring frames includes monitoring frames in a sample frame sequence of about four to seven 20 millisecond frames.

4. The method of claim 1 wherein identifying minimal information frame rates includes:
identifying a transition frame rate in an initial frame; and,
identifying in a frame immediately preceding the initial frame, a full frame rate; and,
wherein performing a CFS includes performing a CFS in a frame following the initial frame.

5. The method of claim 1 wherein identifying a minimal information frame rate includes:
identifying an initial frame with a transition frame rate;
identifying in a frame immediately preceding the initial frame, a transition frame rate greater than an initial frame rate; and,
wherein performing a CFS includes performing a CFS in a frame immediately following the initial frame.

6. The method of claim 1 wherein identifying a minimal information frame rate includes:
identifying an initial frame with a transition frame rate; and,
identifying in a frame immediately preceding the initial frame, an automatic threshold frame rate; and,
wherein performing a CFS includes performing a CFS in a frame immediately following the initial frame.

7. The method of claim 1 wherein identifying a minimal information frame rate includes:
identifying an initial frame with a transition frame rate;
identifying in a frame immediately preceding the initial frame, a transition frame rate less than an initial frame rate; and,
identifying a trigger frame subsequent to the initial frame, the trigger frame having a transition frame rate; and,
wherein performing a CFS includes performing a CFS in a frame following the trigger frame.

8. The method of claim 1 wherein identifying a minimal information frame rate includes:
identifying an initial frame with a transition frame rate;
identifying in a frame immediately preceding the initial frame, a transition frame rate less than an initial frame rate; and,
identifying a full frame rate in all frames subsequent to the initial frame; and,
wherein performing a CFS includes performing a CFS in a last frame in the sample frame sequence.

9. The method of claim 1 wherein identifying a minimal information frame rate includes identifying a transition frame rate selected from a group including a ¼ rate and a ½ rate for a 13 k vocoder and a ½ rate for an Enhanced Variable Rate Coder (EVRC).

10. The method of claim 1 wherein identifying a minimal information frame rate includes identifying an initial frame with an automatic threshold frame rate; and,
wherein performing a CFS includes performing a CFS in a frame immediately following the initial frame.

11. The method of claim 1 wherein identifying a minimal information frame rate includes:
identifying an initial frame with a full rate frame; and,
identifying a trigger frame subsequent to the initial frame, the trigger frame having a transition frame rate; and,
wherein performing a CFS includes performing a CFS in a frame following the trigger frame.

12. The method of claim 1 wherein identifying a minimal information frame rate includes:
identifying an initial frame with a full rate frame; and,
identifying in each frame of the sample frame sequence, a full frame rate; and,
wherein performing a CFS includes performing a CFS in the last frame in the sample sequence.

13. The method of claim 1 wherein monitoring frames includes monitoring forward direction link frames.

14. The method of claim 1 wherein monitoring frames includes monitoring reverse direction link frames.

15. The method of claim 1 wherein monitoring frames includes monitoring forward and reverse direction link frames.

16. The method of claim 1 wherein monitoring frames includes monitoring frames in a wireless device in response to an Implicit Action Time Command.

17. The method of claim 1 wherein monitoring frames includes monitoring frames in a wireless communications base station; and,
wherein performing a CFS includes performing a CFS in response to an Explicit Action Time Command from the wireless communications base station.

18. A system for minimizing loss of voice packets during a wireless communications device Candidate Frequency Search (CFS), the system comprising:
a monitor having an input to accept wireless communication frames and an output to supply monitored frames; and,
a rate identifier having an input to accept the monitored frames and an output to supply a CFS signal identifying a communication link frame in which to perform a CFS in response to identifying minimal information frame rates in the monitored frames.
wherein the monitor includes an input to accept forward link communication frames, an input to accept reverse link communication frames, a control input to accept a forward initiation select signal, a control input to accept a reverse initiation select signal, and an output to supply an initial frame signal;
wherein in response to a forward initiation select signal, the monitor supplies, in the initial frame signal, a forward link frame accepted by the monitor immediately after the receipt of a forward initiation select signal; and,
wherein in response to the reverse initiation select signal, the monitor supplies, in the initial frame signal, a reverse link frame accepted by the monitor immediately after the receipt of a reverse initiation select signal.

19. The system of claim 18 wherein the rate identifier includes a sorter with an input to accept the initial frame signal, a control output to supply a prior frame select signal, a control output to supply a sequence select signal, and an output to supply a CFS initiation signal;
  wherein in response to the initial frame signal, the sorter identifies the rate of the frame in the initial frame signal and supplies:
    the prior frame select signal, in response to identifying a transition frame rate;
    the sequence select signal, in response to identifying a full frame rate; and,
    the CFS initiation signal identifying the frame immediately following the initial frame, in response to identifying an automatic threshold frame rate.

20. The system of claim 19 wherein the monitor includes a control input to accept the prior frame select signal, an output to supply a prior frame signal, a control input to accept the sequence select signal, and an output to supply a sequence signal;
  wherein in response to the prior frame select signal, the monitor supplies the prior frame signal with a frame immediately preceding the initial frame in the initial frame signal; and,
  wherein in response to the sequence select signal, the monitor supplies the sequence signal with a predetermined, consecutive sequence of frames.

21. The system of claim 20 wherein the rate identifier includes a sequence analyzer with an input to accept the sequence signal and an output to supply the CFS initiation signal; and,
  wherein in response to the sequence signal, the sequence analyzer identifies the rates of frames in the sequence signal; and,
  wherein the sequence analyzer supplies, in response to identifying a transition frame rate, a CFS initiation signal identifying a frame following the frame with the transition frame rate.

22. The system of claim 21 wherein the sequence analyzer supplies a CFS initiation signal identifying a last frame in the sequence in response to identifying a full frame rate in all frames subsequent to the initial frame.

23. The system of claim 22 wherein the rate identifier includes a slope analyzer with an input to accept the prior frame signal, a control output to supply the sequence select signal, and an output to supply the CFS initiation signal; and,
  wherein in response to accepting the prior frame signal, the slope analyzer identifies the rate of the prior frame in the prior frame signal and supplies:
    the sequence select signal in response to identifying a transition frame rate less than the initial frame rate;
    the CFS initiation signal for a frame following the initial frame in response to identifying a full frame rate for the prior frame;
    the CFS initiation signal for a frame immediately following the initial frame in response to identifying an automatic threshold rate for the prior frame; and,
    the CFS initiation signal for a frame immediately following the initial frame in response to identifying a transition rate for the prior frame greater than the initial frame rate.

24. The system of claim 23 wherein the monitor has a control input to accept a dual mode initiation select signal; and,
  wherein in response to the dual mode initiation select signal, the monitor supplies in the initial frame signal a first initial frame, the first initial frame a forward link frame accepted by a monitoring subsystem immediately after the receipt of the dual mode initiation select signal and a second initial frame, the second initial frame a reverse link frame accepted by the monitoring subsystem immediately after the receipt of the dual mode initiation select signal.

25. The system of claim 24 wherein the sorter identifies the rate of the first and second initial frames in the initial frame signal; and,
  wherein in response to identifying the first and second initial frame rates, the sorter supplies the prior frame select signal, the sequence select signal, and the CFS initiation signal.

26. The system of claim 25 wherein the monitor, in response to the prior frame select signal, supplies the prior frame signal with a first prior frame immediately preceding the first initial frame in the prior frame select signal and a second prior frame immediately preceding the second initial frame in the prior frame select signal; and,
  wherein the monitor, in response to the sequence select signal, supplies the sequence signal with a first predetermined, consecutive sequence of forward link frames and a second predetermined, consecutive sequence of reverse link frames.

27. The system of claim 26 wherein the sequence analyzer identifies the rates for frames in the first and second frame sequences in response to the sequence signal; and,
  wherein the sequence analyzer supplies the CFS signal responsive to identified frame rates in the first and second frame sequences.

28. The system of claim 27 wherein the slope analyzer identifies the frame rates for the first and second prior frames in response to the prior frame signal; and,
  wherein the slope analyzer supplies the sequence signal and the CFS signal responsive to identified frame rates in the first and second prior frames.

29. The system of claim 28 wherein a transition rate is selected from a group including a ¼ rate and a ½ rate for a 13 k vocoder and a ½ rate for an Enhanced Variable Rate Coder (EVRC).

30. The system of claim 28 wherein an automatic threshold rate is equal to a ⅛ rate.

31. The system of claim 28 wherein a sample frame sequence includes about four to seven 20 millisecond frames.

32. The system of claim 28 further comprising:
  a wireless communications device, the wireless device including the monitor and the rate identifier; and,
  wherein in response to an Implicit Action Time Command, the wireless device supplies the forward, reverse, and dual mode initiation select signals; and,
  wherein in response to the CFS initiation signal, the wireless device initiates a CFS.

33. The system of claim 28 further comprising:
  a wireless communications base station, the base station including the monitor and the rate identifier;
  a wireless communications base station transceiver with an input to accept the CFS initiation signal and a port to transmit an Explicit Action Time Command (EATC) in response to the CFS signal;
  a wireless device; and,
  a wireless device transceiver with a port to receive the EATC from the base station transceiver; and,
  wherein in response to the transceiver receiving the EATC, the wireless device initiates a CFS.

* * * * *